(12) United States Patent
Li et al.

(10) Patent No.: US 10,298,919 B2
(45) Date of Patent: May 21, 2019

(54) LARGE-SCALE POLARIZING 3D ELECTRONIC DISPLAY SYSTEM HAVING TWO INDIVIDUAL ELECTRONIC PIXELS IN EACH PHYSICAL PIXEL AND METHOD FOR MANUFACTURING THE SAME

(71) Applicant: CENTRAL CHINA DISPLAY LABORATORIES, LTD., Zhengzhou (CN)

(72) Inventors: Chao Li, Zhengzhou (CN); Daxin Shi, Zhengzhou (CN); Xianbin Kang, Zhengzhou (CN); Bin Xiong, Zhengzhou (CN); Shuzheng Li, Zhengzhou (CN)

(73) Assignee: CENTRAL CHINA DISPLAY LABORATORIES, LTD., Zhengzhou (CN)

( * ) Notice: Subject to any disclaimer, the term of this patent is extended or adjusted under 35 U.S.C. 154(b) by 83 days.

(21) Appl. No.: 15/488,436

(22) Filed: Apr. 14, 2017

(65) Prior Publication Data

US 2017/0223343 A1    Aug. 3, 2017

Related U.S. Application Data

(63) Continuation-in-part of application No. 15/424,845, filed on Feb. 4, 2017, now abandoned, which is a
(Continued)

(30) Foreign Application Priority Data

Jan. 14, 2011    (CN) .......................... 2011 1 0007877
Jan. 14, 2011    (CN) ...................... 2011 2 0011206 U

(51) Int. Cl.
*H04N 7/18* (2006.01)
*H04N 13/337* (2018.01)
(Continued)

(52) U.S. Cl.
CPC ........... *H04N 13/337* (2018.05); *G02B 27/26* (2013.01); *H04N 13/324* (2018.05);
(Continued)

(58) Field of Classification Search
CPC .. H04N 13/337; H04N 13/324; H04N 13/398; H04N 2213/001; G02B 27/26; Y10T 29/49002
(Continued)

(56) References Cited

U.S. PATENT DOCUMENTS 4,710,934 A * 12/1987 Traynor .............. G06F 11/1076
714/765
5,365,370 A    11/1994 Hudgins
(Continued)

FOREIGN PATENT DOCUMENTS

CN    101060641 A    10/2007
CN    101419351 A    4/2009
(Continued)

OTHER PUBLICATIONS

Swash et al, Distributed pixel mapping for refining dark area in parallax barriers based holoscopic 3D display (Year: 2013).*
(Continued)

*Primary Examiner* — Shan E Elahi
(74) *Attorney, Agent, or Firm* — Matthias Scholl P.C.; Matthias Scholl

(57) ABSTRACT

A manufacturing method for a polarizing stereo electronic large screen display system, including disposing a plurality of physical pixels a display screen; disposing two individual pixels each including three primary colors inside one physical pixel for respectively emitting light for the left eye and the right eye; and disposing a plurality of polarizing films on the plurality of physical pixels. The method results in a display system having high resolution.

9 Claims, 10 Drawing Sheets

Related U.S. Application Data continuation of application No. 13/979,684, filed as application No. PCT/CN2012/070050 on Jan. 5, 2012, now abandoned.

(51) Int. Cl.
*G02B 27/26* (2006.01)
*H04N 13/324* (2018.01)
*H04N 13/398* (2018.01)

(52) U.S. Cl.
CPC ..... *H04N 13/398* (2018.05); *H04N 2213/001* (2013.01); *Y10T 29/49002* (2015.01)

(58) Field of Classification Search
USPC .......................................................... 348/57
See application file for complete search history.

(56) References Cited

U.S. PATENT DOCUMENTS

| | | | |
|---|---|---|---|
| 8,542,270 B2 | 9/2013 | Nelson | |
| 2004/0239835 A1* | 12/2004 | Jung | G02B 5/3016 349/96 |
| 2004/0240777 A1* | 12/2004 | Woodgate | G02B 27/2214 385/16 |
| 2005/0146787 A1* | 7/2005 | Lukyanitsa | G02B 27/2214 359/462 |
| 2006/0082702 A1* | 4/2006 | Jacobs | G02B 5/3083 349/96 |
| 2008/0212003 A1* | 9/2008 | Sata | G02F 1/13363 349/119 |
| 2009/0109154 A1 | 4/2009 | Hong et al. | |
| 2011/0234771 A1* | 9/2011 | Kim | H04N 13/398 348/53 |
| 2012/0162763 A1* | 6/2012 | Son | G02B 27/2214 359/463 |

FOREIGN PATENT DOCUMENTS

| | | |
|---|---|---|
| CN | 101609178 A | 12/2009 |
| CN | 100594737 C | 3/2010 |
| CN | 101750748 A | 6/2010 |
| JP | 2010072290 A | 4/2010 |
| WO | 2007129816 A1 | 11/2007 |
| WO | 2010067506 A1 | 6/2010 |

OTHER PUBLICATIONS

Hosotani et al, Fiberscope type environmental monitoring devices with binocular parallax accommodation mechanism for stereoscopic observation (Year: 1997).*

* cited by examiner

LARGE-SCALE POLARIZING 3D ELECTRONIC DISPLAY SYSTEM HAVING TWO INDIVIDUAL ELECTRONIC PIXELS IN EACH PHYSICAL PIXEL AND METHOD FOR MANUFACTURING THE SAME

CROSS-REFERENCE TO RELATED APPLICATIONS

This application is a continuation-in-part of and claims domestic priority benefits to U.S. patent application Ser. No. 15/424,845, filed Feb. 4, 2017, now pending, which is a continuation of U.S. patent application Ser. No. 13/979,684, filed Jan. 5, 2012, now pending, which is a U.S. National Phase Application of International Pat. Appl. No. PCT/CN2012/070050, designating the United States, and further claims priority benefits to Chinese Pat. Appl. No. CN 201110007877.X filed Jan. 14, 2011, and to Chinese Pat. Appl. No. 201120011206.6 filed Jan. 14, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The present invention is directed to a large-scale 3D electronic display system, and more particularly to a large-scale polarizing 3D electronic display system and the manufacturing process.

Description of the Related Art

Generally, the existing techniques in the field of 3D electronic displays use a pair of shutter mode glasses, and do not include rapid image-switching between the left eye and the right eye. This causes serious visual flickering and consequently results in visual fatigue, and leads to low compatibility between the 3D displays and the 2D displays.

In all the current large-scale polarizing stereoscopic display screens, physical pixels are arranged in alternate rows, in alternate columns, or in odd/even parity arrays. Nevertheless, each physical pixel includes only one real electronic pixel and, therefore, is merely capable of emitting light for the left eye image or the right eye image. As such, all the current large-scale polarizing stereoscopic display screens have low resolution. Accordingly, a stereoscopic display screen that has high resolution and is suitable for both indoor and outdoor application is desired.

SUMMARY OF THE INVENTION

In view of the above-described problems, it is one objective of the invention to provide a large-scale polarizing 3D electronic display system and the manufacturing process, which overcome the problems of the existing technology. To achieve the above objective, there is provided a large-scale polarizing 3D electronic display system and the manufacturing process. The large-scale polarizing 3D electronic display system includes two individual electronic pixels in each physical display pixel, wherein each individual electronic pixel has 3 primary colors (i.e., red, green and blue colors), and therefore the system has no loss of resolution, does not has the low compatibility problem between the 3D and 2D displays, has high definition, and is easy to operate.

To achieve the above objective, there is provided a manufacturing process of a large-scale polarizing 3D electronic display system including the following steps:

1) disposing a plurality of display elements or display pixels on the display screen, and controlling the plurality of the display elements or the display pixels to emit light via a controller;

2) disposing two individual pixels at each display element or display pixel, one of the two individual pixels emits light for the left eye image, and the other emits light for the right eye image; each of the two individual pixels includes three primary colors (i.e., R, G, B colors); and 3) disposing a plurality of polarizing films above the plurality of display elements or display pixels, respectively.

In a class of one embodiment, the plurality of polarizing films may be set on the plurality of display elements or display pixels individually, row by row, or column by column.

In a class of one embodiment, the plurality of polarizing films may be used as a block or a plate for covering or shielding several display elements or display pixels.

In a class of one embodiment, the plurality of light polarizing film uses linear polarization, the angle difference between left polarizing and right polarizing is 90°, and errors are less than ±10%.

In a class of one embodiment, the plurality of light polarizing film uses circular polarization and either (i) the polarizing angles are in parallel and the phases are orthogonal, or (ii) the polarizing angles are orthogonal and the phases are in parallel, wherein errors are less than ±10% in either (i) or (ii).

In addition, to achieve the above objective, there is provided a large-scale polarizing 3D electronic display system including a controller and a display screen, the controller being connected with the display screen, the display screen including a plurality of physical display elements or physical display pixels, each physical display element or physical display pixel including two individual electronic pixels, one individual electronic pixel emitting light for the left eye, and the other individual electronic pixel emitting light for the right eye, each of the two individual electronic pixels including three primary colors (i.e., red, green and blue colors), a plurality of polarizing films being disposed on the surface of the plurality of display elements or display pixels.

In a class of one embodiment, the plurality of polarizing films is set on the plurality of physical display elements or physical display pixels individually, row by row, or column by column.

In a class of one embodiment, the plurality of polarizing films is a block polarizing film or a plate polarizing film for covering or shielding several physical pixels.

In a class of one embodiment, the electronic pixels for emitting lights for the left eye and the right eyes are arranged row by row, column by column, in odd parity array or even parity array.

In a class of one embodiment, the plurality of light polarizing film uses linear polarization, the angle difference between left polarizing and right polarizing is 90°, and errors are less than ±10%.

In a class of one embodiment, the plurality of light polarizing film uses circular polarization and either (i) the polarizing angles are in parallel and the phases are orthogonal, or (ii) the polarizing angles are orthogonal and the phases are in parallel, wherein errors are less than ±10% in either (i) or (ii).

Advantages of the invention are summarized as follows:

The present invention can be used for large electronic display adopting a polarization system for indoor and outdoor application, without any limit on the pixel size. It can also be used for all kinds of smaller screens. The present invention doesn't use electronic shutter glasses which may cause visual fatigue. The stereoscopic display in the present invention is completely compatible with normal 2D display, thus effect of stereoscopic display is improved, and comfort of eyes is greatly enhanced. In addition, when the present invention is applied in a practical SD (standard-definition), HD (high-definition), or UHD (ultra-high-definition) display system, since there are two individual electronic pixels including three primary colors (i.e., R, G, B colors) in each physical pixel for respectively emitting light for the left and right eyes, there is no pixel loss to result in the resolution loss.

The other advantages, objectives and characteristics of the present invention will be described in the succeeding explanation.

DETAILED DESCRIPTION OF THE EMBODIMENTS

The invention is further illustrated by detailed description of the embodiments combined with the drawings.

Figure 1:
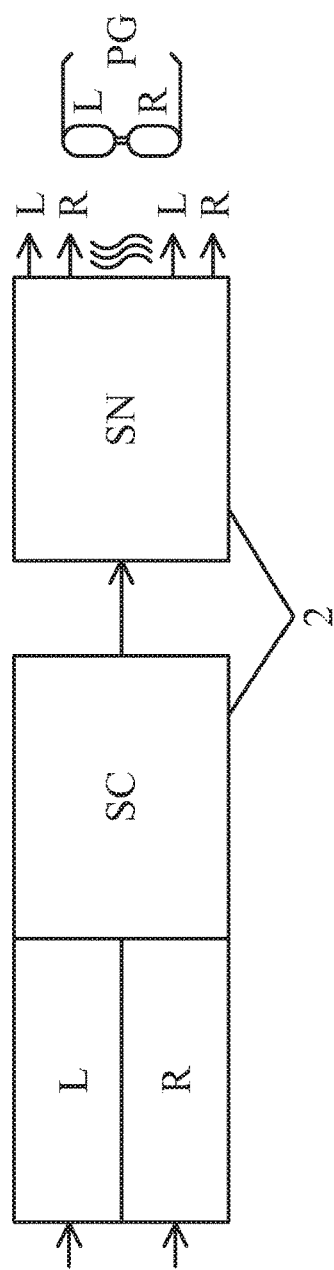
FIG. 1 is the block diagram of a large-scale polarizing 3D electronic display system of the present invention.

As shown in FIG. 1, the present invention includes 3D electronic display system 2 that includes a SC electronic controller and a display screen SN. The SC electronic controller may be a scrambler, mixer or complex; the display screen SN has a plurality of display pixels. The SC electronic controller connects with the display screen SN. The SC electronic controller controls transmission and image processing. Send the image information data for the left & right eye to the display screen SN with the SC electronic controller. Then, separate the left eye image and the right eye image with a polarization system having a plurality of polarizing films (the display pixels of the display screen are covered with the L-type and R-type polarizing films or the polarization boards which have orthogonal relations between the polarizing angles or between the polarizing phase, wherein the L-type polarizing film or polarization board transmits light emitted by the pixel for emitting light for the left eye, and the R-type polarizing film or polarization board transmits light emitted by the pixel for emitting light for the right eye). The SC electronic controller sends the image information data for the left & right eyes to the pixels shielded with L-type and R-type polarizing film or polarizing plate, respectively, to form the left and the right eye images. When viewing, an observer can wear a pair of polarizing glasses including polarizing film or polarizing plate having orthogonal relations between the polarizing angles or between the polarizing phase to separate the left and the right eye images, such that the left eye image and the right eye image enter the left eye and the right eye, respectively, to form a stereoscopic image in the observer's brain.

Figure 2:
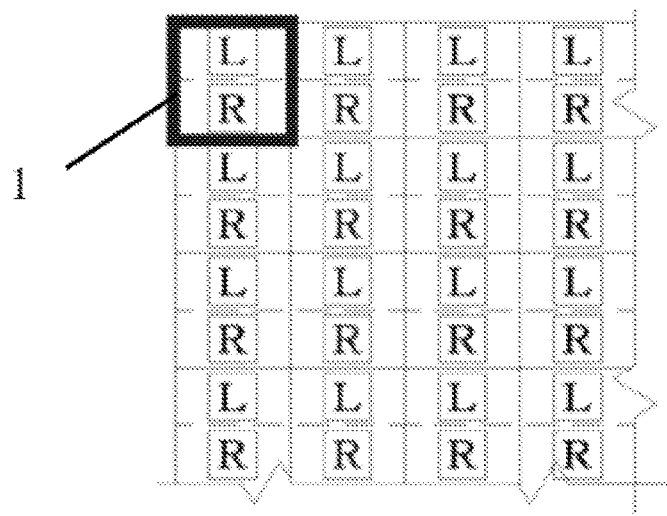
FIG. 2 shows the physical display pixels each having two individual pixels arranged in a column.
Figure 3:
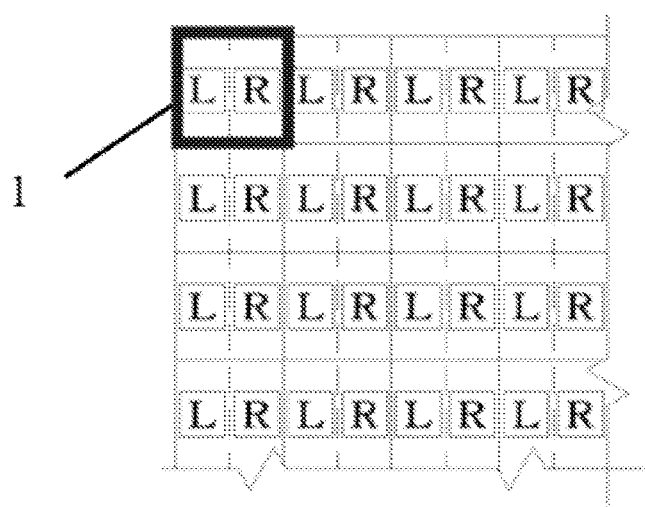
FIG. 3 shows the physical display pixels each having two individual pixels arranged in a row.
Figure 4:
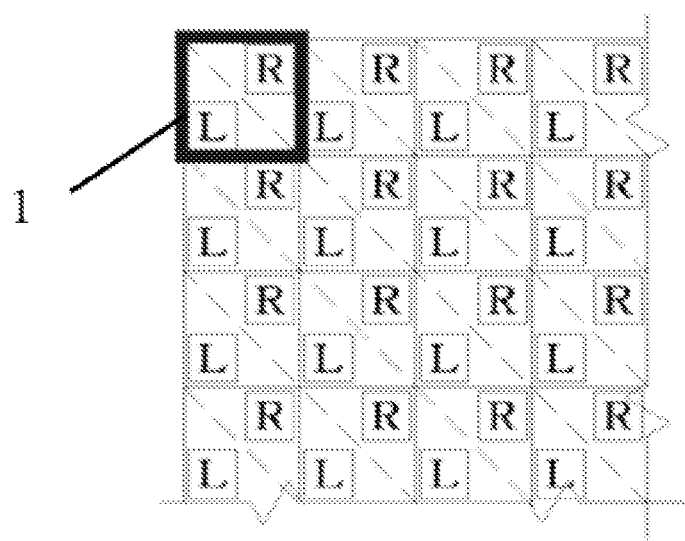
FIG. 4 shows the physical display pixels each having two individual pixels arranged in a right-inclined line.
Figure 5:
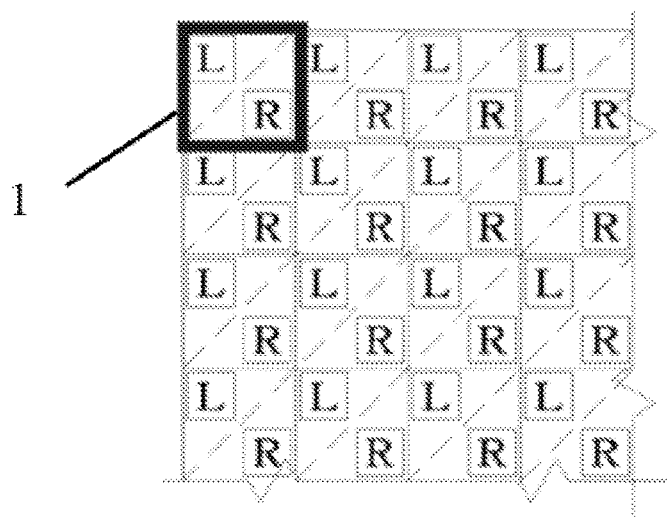
FIG. 5 shows the physical display pixels each having two individual pixels arranged in a left-inclined line.
Figure 6:
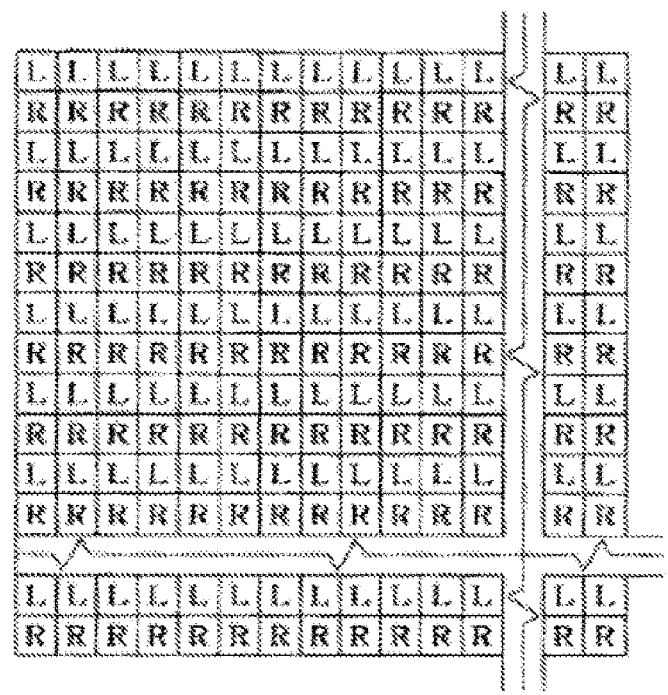
FIG. 6 is the schematic diagram showing that the pixels for emitting light for the left eye and the pixels for emitting light for the right eye are arranged in alternate rows.
Figure 7:
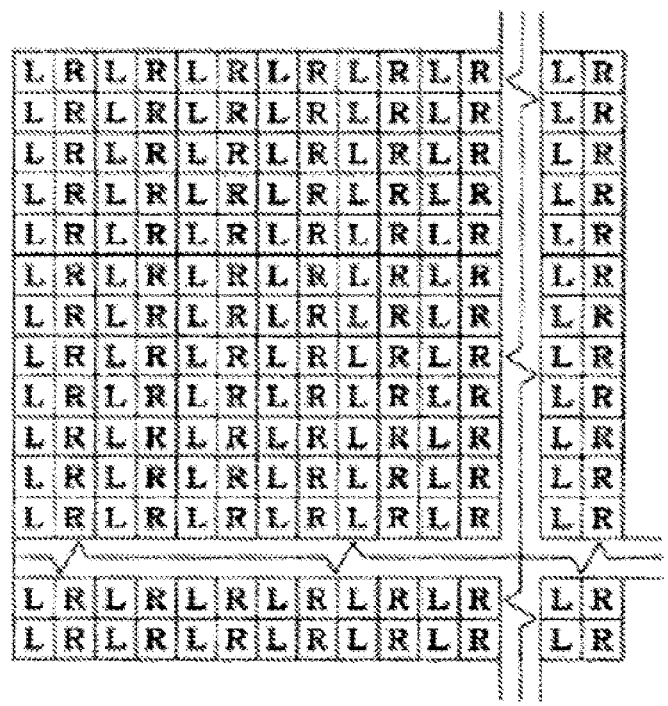
FIG. 7 is the schematic diagram showing that the pixels for emitting light for the left eye and the pixels for emitting light for the right eye are arranged in alternate columns.
Figure 8:
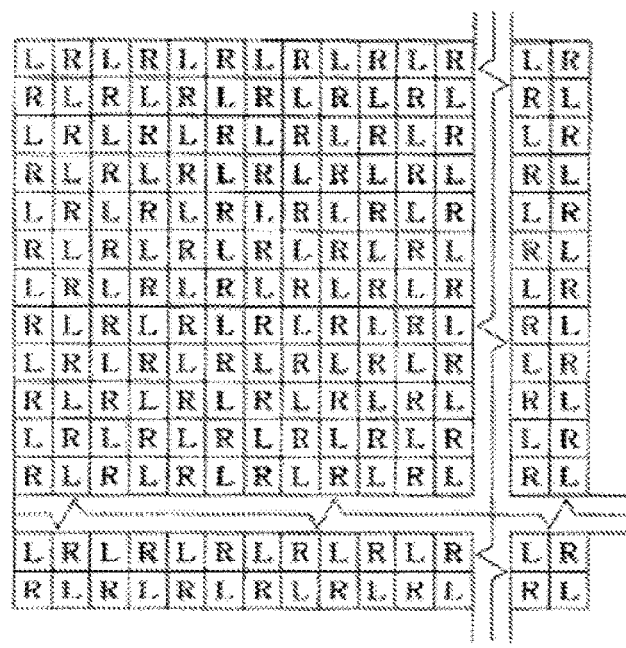
FIG. 8 is the schematic diagram showing that the pixels for emitting light for the left eye and the pixels for emitting light for the right eye are arranged in odd parity array.
Figure 9:
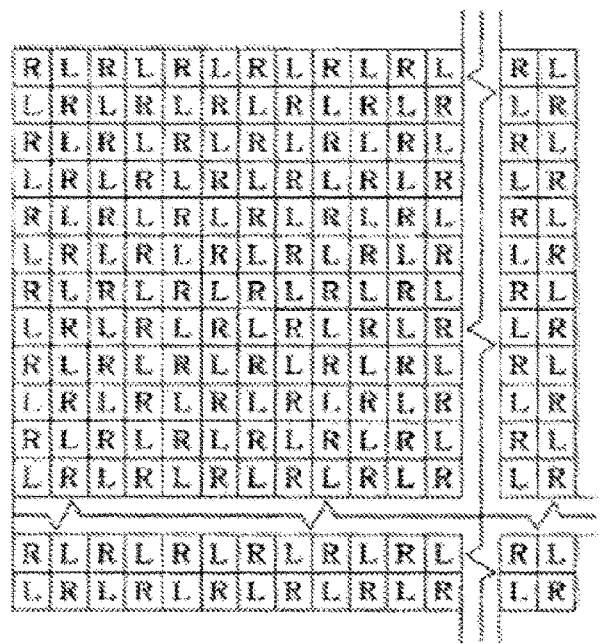
FIG. 9 is the schematic diagram showing that the pixels for emitting light for the left eye and the pixels for emitting light for the right eye are arranged in even parity array.

The display pixel of the present invention refers to physical pixel, each display pixel includes two individual electronic pixels, i.e. inserting two individual electronic pixels within each display pixel. In this way, stereoscopic display is realized, when each physical pixel can be divided into two completely individual pixels, resolution of the left eye and the right eye image have no loss. The individual electronic pixel in the present invention refers to a 3-in-1 electronic pixel, that is there are three primary colors in one electronic pixel and each electronic pixel is capable of forming full color. Each of two individual electronic pixels include one left-eye pixel labeled by L for emitting light for the left eye image and one right-eye pixel labeled by R for emitting light for the right eye image. The left-eye and the right-eye pixels can be arranged horizontally, vertically, or diagonally. Specifically, the left-eye and the right-eye pixels can be arranged in a row, as shown in FIG. 2; or arranged in a column, as shown in FIG. 3; or arranged in a right-inclined line, as shown in FIG. 4; or arranged in a left inclined line, as shown in FIG. 5. The physical pixel 1 is pointed out in FIGS. 2-5. As shown in FIG. 6, FIG. 7, FIG. 8 and FIG. 9, the display pixels or the display elements of the display screen can be divided into two sets: the left-eye pixels L and the right-eye pixels R, and the left-eye pixels L and the right-eye pixels R can be arranged row by row, column by column, in a parity array or even parity array. It should be mentioned that, in every physical pixel, merely two individual electronic pixels are enclosed wherein, the objective of the invention would not be achieved if more or less individual electronic pixels are enclosed in one physical pixel. Moreover, in every individual electronic pixel, merely three primary colors are enclosed wherein, that is merely two sets of RGB colors are enclosed in each physical pixel, the objective of the invention would not be achieved if more or less sets of RGB colors pixels are enclosed in one physical pixel.

Figure 10:
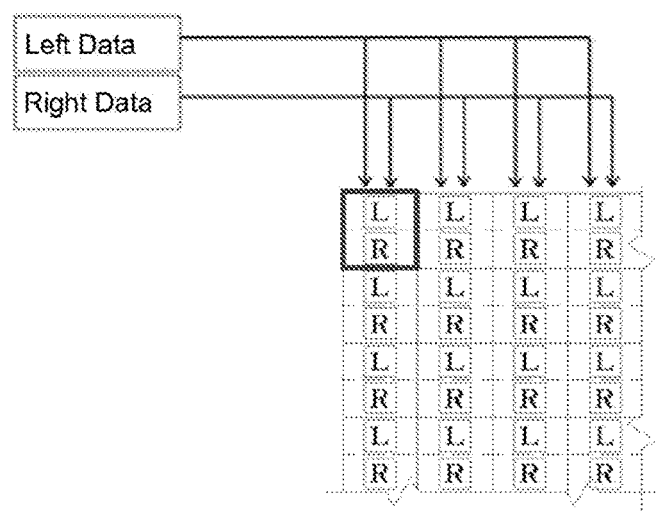
FIG. 10 is the way of data transmission to the left and right eyes when applying the display screen comprising a plurality of physical pixels each having two individual pixels arranged in a column.

The light polarizing film may use linear polarization or circular polarization to polarize light. In linear polarization mode, the polarizing angle difference between the left eye and the right eye is 90°; errors are less than ±10%. In circular polarization mode, either the two polarizing angles are in parallel and the two phases are orthogonal, or the polarizing angles are orthogonal, and the phases are in parallel, errors are less than ±10%. For the physical pixels, the polarizing films may be separated, i.e. each polarizing film is set on a single physical pixel; the polarizing films may be set row by row or column by column, i.e., the polarizing films are shaped into strips or belts to set on a row or a column of the physical elements or physical pixels; or the polarizing films may be set into blocks or plates for covering or shielding some pixels. The direction of polarizing light of the display screen SN is consistent with the direction of polarizing light of the polarizing glasses PG.

when the present invention is applied in a practical SD (standard-definition), HD (high-definition), or UHD (ultra-high-definition) display system, since there are two individual electronic pixels including three primary colors (i.e., red, green and blue colors) in each physical pixel for respectively emitting light for the left and right eyes, there is no pixel loss to result in the resolution loss. For example, when applying the display screen comprising a plurality of physical pixels each having two individual pixels arranged in a column in a practical SD, HD, or UHD display system, the way of data transmission to the left and right eyes is demonstrated as in FIG. 10. Such a way of data transmission ensures that there is no pixel loss to result in the resolution loss.

The manufacturing process of the invention includes:

step 1, several display pixels are set on the display screen SN; the display screen SN is connected to the SC electronic controller; and the display pixels are controlled by the SC electronic controller to emit light;

step 2, two individual pixels are set at each display pixel, in which one of the two individual pixels emits light for the left eye image, and the other emits light for the right eye image; each of the two individual pixels comprises three primary RGB colors.

step 3, the polarizing film is set on each display pixel. The polarizing film can be sticked or covered on each display pixel, fixed on each display pixel by other way. The screen surface can be waterproof processed for outdoor application.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of manufacturing a large-scale polarizing 3D electronic display system, the method comprising:

connecting an electronic controller with a display screen, the electronic controller being adapted to control transmission of data to the display screen and image processing;

utilizing two individual electronic pixels each comprising three primary colors to form each display pixel in a plurality of display pixels, and disposing the plurality of display pixels on the display screen, the plurality of display pixels being controllable by the electronic controller to emit light; and disposing a plurality of L-type polarizing films respectively on a portion of the plurality of display pixels to form a plurality of left-eye pixels, and disposing a plurality of R-type polarizing films respectively on the remaining of the plurality of display pixels to form a plurality of right-eye pixels, so as to separate the image sent to the left eye from the image sent to the right eye, wherein the plurality of L-type polarizing films is adapted to transmit image sent by the plurality of left-eye pixels to the left eye, and the plurality of R-type polarizing films is adapted to transmit image sent by the plurality of right-eye pixels to the right eye.

2. The method of claim 1, wherein the plurality of L-type or R-type polarizing films polarizes light using linear polarization, the angle difference between left polarizing and right polarizing is 90°, and errors are less than ±10%.

3. The method of claim 1, wherein the plurality of L-type or R-type polarizing films polarizes light using circular polarization, and either (i) the polarizing angles are in parallel and the phases are orthogonal, or (ii) the polarizing angles are orthogonal and the phases are in parallel, wherein errors are less than ±10% in either (i) or (ii).

4. A large-scale polarizing 3D electronic display system, comprising:

an electronic controller;

a display screen comprising a plurality of display pixels, each of the plurality of display pixels having two individual electronic pixels, each of the two individual electronic pixels having three primary colors adapted for forming full color;

a plurality of L-type polarizing films; and a plurality of R-type polarizing films;

wherein:

the electronic controller is connected to the display screen and is adapted to control transmission of data to the display screen to cause the display pixels to emit light; and the plurality of L-type polarizing films is respectively disposed on a portion of the plurality of display pixels to form a plurality of left-eye pixels, and the plurality of L-type polarizing films is respectively on the remaining of the plurality of display pixels to form a plurality of right-eye pixels, so as to separate the image sent to the left eye from the image sent to the right eye, wherein the plurality of L-type polarizing films is adapted to transmit image sent by the plurality of left-eye pixels to the left eye, and the plurality of R-type polarizing films is adapted to transmit image sent by the plurality of right-eye pixels to the right eye.

5. The display system of claim 4, wherein the plurality of L-type or R-type polarizing films polarizes light using linear polarization, the angle difference between left polarizing and right polarizing is 90°, and errors are less than ±10%.

6. The display system of claim 4, wherein the plurality of L-type or R-type polarizing films polarizes light using circular polarization, and either (i) the polarizing angles are in parallel and the phases are orthogonal, or (ii) the polarizing angles are orthogonal and the phases are in parallel, wherein errors are less than ±10% in either (i) or (ii).

7. The display system of claim 4, wherein the plurality of display pixels is arranged row by row or column by column.

8. The display system of claim 4, wherein the plurality of display pixels forms a parity array.

9. The display system of claim 4, wherein the plurality of display pixels forms an even parity array.

* * * * *